United States Patent
Yano et al.

(10) Patent No.: US 10,431,832 B2
(45) Date of Patent: *Oct. 1, 2019

(54) STAINLESS-STEEL FOIL FOR SEPARATOR OF POLYMER ELECTROLYTE FUEL CELL

(71) Applicant: JFE STEEL CORPORATION, Tokyo (JP)

(72) Inventors: Takayoshi Yano, Tokyo (JP); Shin Ishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/302,825

(22) PCT Filed: Jan. 29, 2015

(86) PCT No.: PCT/JP2015/000402
§ 371 (c)(1),
(2) Date: Apr. 15, 2019

(87) PCT Pub. No.: WO2015/159467
PCT Pub. Date: Oct. 22, 2015

(65) Prior Publication Data
US 2017/0033372 A1    Feb. 2, 2017

(30) Foreign Application Priority Data
Apr. 15, 2014 (JP) ................. 2014-083782

(51) Int. Cl.
*H01M 8/021* (2016.01)
*H01M 8/0208* (2016.01)
(Continued)

(52) U.S. Cl.
CPC ............. *H01M 8/021* (2013.01); *C23C 28/02* (2013.01); *C25D 3/12* (2013.01); *C25D 3/40* (2013.01);
(Continued)

(58) Field of Classification Search
None
See application file for complete search history.

(56) References Cited

U.S. PATENT DOCUMENTS 6,660,419 B1 * 12/2003 Nishida ............... H01M 8/0206
                                                              429/210
9,799,896 B2   10/2017 Yano et al.
(Continued)

FOREIGN PATENT DOCUMENTS

CN    102859768 A    1/2013
EP    2 560 225 A1   2/2013
(Continued)

OTHER PUBLICATIONS

Nov. 29, 2017 Office Action issued in Korean Patent Application No. 10-2016-7028079.
(Continued)

*Primary Examiner* — Basia A Ridley
*Assistant Examiner* — Heng M. Chan
(74) *Attorney, Agent, or Firm* — Oliff PLC

(57) ABSTRACT

The surface of a substrate made of stainless-steel foil is coated with a Sn alloy layer, with a strike layer in between. The coverage of the strike layer on the substrate is 2% to 70%.

12 Claims, 2 Drawing Sheets

(51) Int. Cl.
  *H01M 8/0228* (2016.01)
  *H01M 8/1004* (2016.01)
  *C25D 5/36* (2006.01)
  *C25D 5/12* (2006.01)
  *C25D 3/12* (2006.01)
  *C25D 3/40* (2006.01)
  *C25D 3/46* (2006.01)
  *C25D 3/48* (2006.01)
  *C25D 3/60* (2006.01)
  *H01M 8/026* (2016.01)
  *C23C 28/02* (2006.01)
  *H01M 8/1018* (2016.01)

(52) U.S. Cl.
  CPC ............... *C25D 3/46* (2013.01); *C25D 3/48* (2013.01); *C25D 3/60* (2013.01); *C25D 5/12* (2013.01); *C25D 5/36* (2013.01); *H01M 8/026* (2013.01); *H01M 8/0208* (2013.01); *H01M 8/0228* (2013.01); *H01M 8/1004* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2003/0113577 A1* | 6/2003 | Zheng | B32B 15/013 428/673 |
| 2004/0197661 A1* | 10/2004 | Utsunomiya | C23C 30/00 429/247 |
| 2013/0177837 A1 | 7/2013 | Nishiyama et al. | |
| 2013/0244129 A1 | 9/2013 | Shibuya et al. | |
| 2016/0122891 A1 | 5/2016 | Tani et al. | |
| 2016/0240866 A1 | 8/2016 | Yano et al. | |
| 2017/0033372 A1 | 2/2017 | Yano et al. | |

FOREIGN PATENT DOCUMENTS

| | | | |
|---|---|---|---|
| EP | 2896499 A1 | | 7/2015 |
| EP | 3133682 A1 | | 2/2017 |
| EP | 3285319 A1 | | 2/2018 |
| JP | H08-180883 A | | 7/1996 |
| JP | H10-228914 A | | 8/1998 |
| JP | 2006097088 A | * | 4/2006 |
| JP | 2008-078104 A | | 4/2008 |
| JP | 2009-32671 | * | 2/2009 |
| JP | 2010024508 A | | 2/2010 |
| JP | 2012-018864 A | | 1/2012 |
| JP | 2012-178324 A | | 9/2012 |
| JP | 2013-118096 A | | 6/2013 |
| JP | 2013-243113 A | | 12/2013 |
| JP | 5700183 B1 | | 4/2015 |
| JP | 5796694 B1 | | 10/2015 |
| KR | 2012-122090 | * | 11/2012 |
| KR | 20130004355 A | | 1/2013 |
| WO | 2011132797 | * | 10/2011 |
| WO | 2014189081 A1 | | 11/2014 |
| WO | 2015059857 A1 | | 4/2015 |

OTHER PUBLICATIONS

Jan. 9, 2017 Extended Search Report issued in European Patent Application No. 15779849.7.
May 17, 2016 Office Action issued in Taiwanese Patent Application No. 104106018.
Mar. 31, 2015 International Search Report issued in International Patent Application No. PCT/JP2015/000402.
Mar. 13, 2018 Office Action issued in Chinese Patent Application No. 201580018806.6.

* cited by examiner

STAINLESS-STEEL FOIL FOR SEPARATOR OF POLYMER ELECTROLYTE FUEL CELL

TECHNICAL FIELD

The disclosure relates to a stainless-steel foil for a separator of a polymer electrolyte fuel cell having excellent corrosion resistance and adhesion property.

BACKGROUND

In recent years, fuel cells that have excellent generation efficiency and emit no $CO_2$ are being developed for global environment protection. Such a fuel cell generates electricity from $H_2$ and $O_2$ through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators.

Fuel cells are classified as phosphoric acid fuel cells, molten carbonate fuel cells, solid oxide fuel cells, alkaline fuel cells, and proton-exchange membrane fuel cells (PEMFC) or polymer electrolyte fuel cells (PEFC) according to the type of electrolyte membrane used, which are each being developed.

Of these fuel cells, polymer electrolyte fuel cells have, for example, the following advantages over other fuel cells.

(a) The fuel cell operating temperature is about 80° C., so that electricity can be generated at significantly low temperature.

(b) The fuel cell body can be reduced in weight and size.

(c) The fuel cell can be started promptly, and has high fuel efficiency and power density.

Polymer electrolyte fuel cells are therefore expected to be used as power sources in electric vehicles, home or industrial stationary generators, and portable small generators.

A polymer electrolyte fuel cell extracts electricity from $H_2$ and $O_2$ via a polymer membrane. As illustrated in FIG. 1, a membrane-electrode joined body 1 is sandwiched between gas diffusion layers 2 and 3 (for example, carbon paper) and separators (bipolar plates) 4 and 5, forming a single component (a single cell). An electromotive force is generated between the separators 4 and 5.

The membrane-electrode joined body 1 is called a membrane-electrode assembly (MEA). The membrane-electrode joined body 1 is an assembly of a polymer membrane and an electrode material such as carbon black carrying a platinum catalyst on the front and back surfaces of the membrane, and has a thickness of several 10 μm to several 100 μm. The gas diffusion layers 2 and 3 are often integrated with the membrane-electrode joined body 1.

In the case of actually using polymer electrolyte fuel cells, typically several tens to hundreds of single cells such as the above are connected in series to form a fuel cell stack and put to use.

The separators 4 and 5 are required to function not only as (a) partition walls separating single cells, but also as (b) conductors carrying generated electrons, (c) air passages 6 through which $O_2$ (air) flows and hydrogen passages 7 through which $H_2$ flows, and (d) exhaust passages through which generated water or gas is exhausted (the air passages 6 or the hydrogen passages 7 also serve as the exhaust passages).

The separators therefore need to have excellent durability and electric conductivity.

Regarding durability, about 5000 hours are expected in the case of using the polymer electrolyte fuel cell as a power source in an electric vehicle, and about 40000 hours are expected in the case of using the polymer electrolyte fuel cell as a home stationary generator or the like. Since the proton conductivity of the polymer membrane (electrolyte membrane) decreases if metal ions leach due to corrosion, the separators need to be durable for long-term generation.

Regarding electric conductivity, the contact resistance between the separator and the gas diffusion layer is desirably as low as possible, because an increase in contact resistance between the separator and the gas diffusion layer causes lower generation efficiency of the polymer electrolyte fuel cell. A lower contact resistance between the separator and the gas diffusion layer contributes to better power generation property.

Polymer electrolyte fuel cells using graphite as separators have already been commercialized. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, Patent Literature (PTL) 1 discloses a technique of using, as a separator, a metal such as stainless steel or a titanium alloy that easily forms a passive film. The formation of the passive film, however, causes an increase in contact resistance, and leads to lower generation efficiency. These metal materials have thus been pointed out to have problems such as high contact resistance and low corrosion resistance as compared with the graphite material.

PTL 2 discloses a technique of plating the surface of a metal separator such as an austenitic stainless-steel sheet (SUS304) with gold to reduce the contact resistance and ensure high output. However, a thin gold plating is hard to be kept from the formation of pinholes, and a thick gold plating is problematic in terms of cost.

To solve these problems, we previously proposed in PTL 3 "a metal sheet for a separator of a polymer electrolyte fuel cell wherein a layer made of a Sn alloy layer is formed on the surface of a metal substrate and the layer contains conductive particles".

CITATION LIST

Patent Literatures

PTL 1: JP H8-180883 A
PTL 2: JP H10-228914 A
PTL 3: JP 2012-178324 A
PTL 4: JP 2013-118096 A

SUMMARY

Technical Problem

Through the development of the metal sheet for a separator of a polymer electrolyte fuel cell described in PTL 3, we succeeded in improving the corrosion resistance in the use environment of separators of polymer electrolyte fuel cells.

In applications to fuel cells used in vehicles, etc., however, thinner separators are needed to make fuel cells more compact in terms of installation space and energy efficiency.

We accordingly proposed in PTL 4 a surface treatment method for a separator of a fuel cell wherein the surface of a substrate made of high Cr stainless steel is subjected to anode electrolytic treatment that induces a Cr transpassive dissolution reaction and then immediately subjected to $Ni_3Sn_2$ layer formation, without the formation of an intermediate layer.

We thus succeeded in obtaining a separator of a polymer electrolyte fuel cell having excellent corrosion resistance even in the case where the film made of a Sn alloy layer such as a $Ni_3Sn_2$ layer (hereafter such a film is also referred to as "Sn alloy layer") is made thinner.

In the fuel cell manufacturing process, high adhesion between the substrate and the Sn alloy layer is necessary so that the Sn alloy layer does not peel off from the substrate. With the technique described in PTL 4, however, the adhesion property is not always sufficient, for example, in the process of forming the separator into a desired shape, in the process of assembling the fuel cell, or when the fuel cell vibrates violently during use, and there is a possibility that the layer peels.

It could therefore be helpful to provide a stainless-steel foil for a separator of a polymer electrolyte fuel cell not only having excellent electric conductivity but also having both excellent corrosion resistance in the use environment of separators of polymer electrolyte fuel cells and excellent adhesion property between the substrate and the Sn alloy layer even in the case where the Sn alloy layer is made thinner.

Solution to Problem

We employed stainless-steel foil as the material of a separator of a polymer electrolyte fuel cell, and studied various film formation processes for the stainless-steel foil.

As a result, we made the following discoveries.

(1) First, to improve the adhesion property, we attempted to form a strike layer made of a metal layer of Ni, Cu, or the like as a base layer on the surface of a substrate made of stainless-steel foil, prior to the formation of a Sn alloy layer. We then discovered that forming the strike layer as the base layer on the surface of the substrate made of stainless-steel foil significantly improves the adhesion property of the Sn alloy layer.

(2) However, we also discovered that the formation of the strike layer can significantly degrade the corrosion resistance depending on the type of the strike. The mechanism of the degradation in corrosion resistance is considered as follows. If the Sn alloy layer has one or more defects from the surface through to the strike layer, ions causing corrosion reach the strike layer through the defects, initiating the corrosion of the strike layer. In the case where the strike layer has lower corrosion resistance than the Sn alloy layer above the strike layer, only the strike layer is continuously corroded, as a result of which a wide area of the strike layer is lost in a short time. This causes the Sn alloy layer above the strike layer to peel, exposing the stainless-steel foil substrate to the separator use environment. The corrosion resistance thus degrades significantly.

(3) The aforementioned degradation of the corrosion resistance can be prevented by making the Sn alloy layer thicker to suppress the formation of through defects. This is, however, disadvantageous in terms of making the fuel cell more compact.

(4) We carried out further research to prevent the degradation of the corrosion resistance without making the Sn alloy layer thicker.

As a result, we discovered that, by limiting the coverage of the strike layer on the substrate to the range of 2% to 70%, the continuous corrosion of the strike layer is suppressed, so that the degradation of the corrosion resistance associated with the peeling of the Sn alloy layer is effectively prevented without degradation in adhesion property.

The reason why limiting the coverage of the strike layer on the substrate to the range of 2% to 70% suppresses the continuous corrosion of the strike layer is considered as follows.

By limiting the coverage of the strike layer on the substrate to the range of 2% to 70%, a discontinuous portion such as a non-coating area of the strike layer appears on the surface of the stainless-steel foil substrate. In the discontinuous portion, the Sn alloy layer and the stainless-steel foil substrate adhere to each other, and ions causing corrosion do not spread, so that the propagation of the corrosion is inhibited. Hence, the continuous corrosion of the strike layer can be suppressed even in the case where the Sn alloy layer is made thinner.

(5) We also discovered that, by distributing the strike layer in the form of islands and limiting the maximum diameter of each island-like coating portion to 1 μm or less, discontinuous portions such as non-coating areas of the strike layer are formed throughout the surface of the substrate, as a result of which the degradation of the corrosion resistance can be prevented more effectively.

We additionally discovered that this makes the whole interface between the stainless-steel foil of the substrate and the Sn alloy layer rough, and so ensures high adhesion property by the anchor effect.

(6) We also discovered that, while the strike layer may be a metal layer of Au, Ag, Cu, Ni, or the like or an alloy layer containing at least one selected from these elements, a Ni—P strike layer made of an alloy layer of Ni and P is particularly suitable as the strike layer for its low material cost. We further discovered that, by limiting the P content in the Ni—P strike layer to the range of 5% to 22% by mass, the corrosion resistance can be maintained more stably even in the event of long exposure to high potential in the separator use environment.

The reason for this is considered as follows. By limiting the P content in the Ni—P strike layer to the range of 5% to 22% by mass, a more stable Ni—P compound in the separator use environment is formed, with it being possible to further suppress the corrosion of the strike layer.

(7) In addition, we discovered that coating the surface of the Sn alloy layer with a Sn-containing oxide layer further improves the corrosion resistance.

The inventers consider the reason for this as follows. Since the Sn-containing oxide layer is very stable in the separator use environment, coating the surface of the Sn alloy layer with the Sn-containing oxide layer suppresses the corrosion of the Sn alloy layer effectively. The corrosion resistance can be further improved by such an effect.

The disclosure is based on the aforementioned discoveries.

We thus provide the following.

1. A stainless-steel foil for a separator of a polymer electrolyte fuel cell, including: a substrate made of stainless-steel foil; and a Sn alloy layer with which a surface of the substrate is coated, with a strike layer in between (that is, between the Sn alloy layer and the surface of the substrate), wherein a coverage of the strike layer on the substrate is 2% to 70%.

2. The stainless-steel foil for a separator of a polymer electrolyte fuel cell according to the foregoing 1, wherein the strike layer is distributed in a form of islands, and a maximum diameter of each of the islands as coating portions is 1 μm or less.

3. The stainless-steel foil for a separator of a polymer electrolyte fuel cell according to the foregoing 1 or 2, wherein the Sn alloy layer contains at least one selected from the group consisting of Ni and Fe.

4. The stainless-steel foil for a separator of a polymer electrolyte fuel cell according to any one of the foregoing 1 to 3, wherein the Sn alloy layer contains $Ni_3Sn_2$.

5. The stainless-steel foil for a separator of a polymer electrolyte fuel cell according to any one of the foregoing 1 to 4, wherein the strike layer contains at least one element selected from the group consisting of Ni, Cu, Ag, and Au.

6. The stainless-steel foil for a separator of a polymer electrolyte fuel cell according to the foregoing 5, wherein the strike layer is made of an alloy layer of Ni and P, and has a P content in a range of 5% to 22% by mass.

7. The stainless-steel foil for a separator of a polymer electrolyte fuel cell according to any one of the foregoing 1 to 6, including a Sn-containing oxide layer on a surface of the Sn alloy layer.

Advantageous Effect

It is possible to obtain a separator of a fuel cell having excellent corrosion resistance and adhesion property and thus obtain a polymer electrolyte fuel cell having excellent durability at low cost, without compromising compactness.

BRIEF DESCRIPTION OF THE DRAWINGS

In the accompanying drawings.

DETAILED DESCRIPTION

Figure 1:
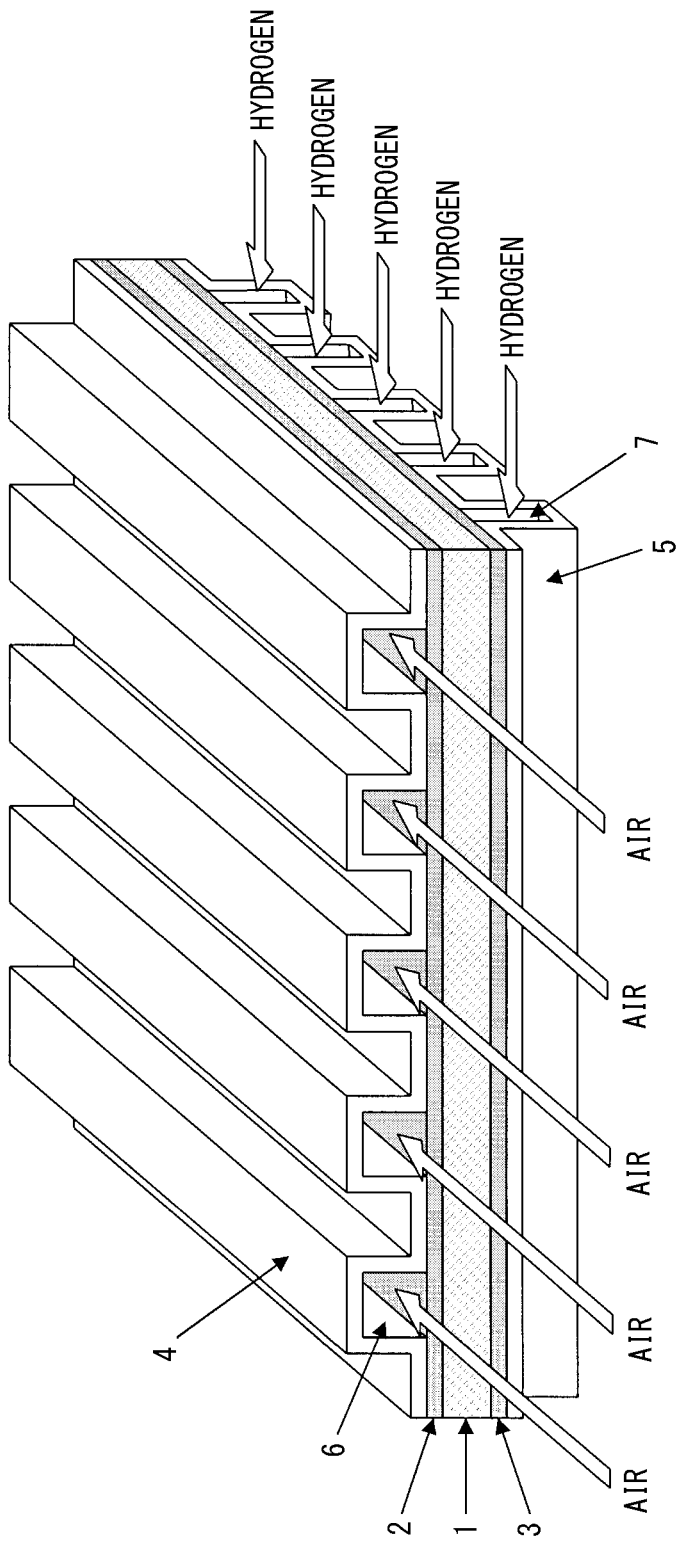
FIG. 1 is a schematic diagram illustrating the basic structure of a fuel cell.

Detailed description is given below.
(1) Metal Sheet Used as Substrate

Stainless-steel foil used as a substrate in the disclosure is not particularly limited, but a stainless-steel sheet excellent in corrosion resistance (ferritic stainless-steel sheet, austenitic stainless-steel sheet, dual-phase stainless-steel sheet) is particularly advantageous.

For example, SUS447J1 (Cr: 30% by mass, Mo: 2% by mass), SUS445J1 (Cr: 22% by mass, Mo: 1% by mass), SUS443J1 (Cr: 21% by mass), SUS439 (Cr: 18% by mass), SUS316L (Cr: 18% by mass, Ni: 12% by mass, Mo: 2% by mass), or the like is suitable.

In view of the installation space and weight when stacking fuel cells, the sheet thickness of the stainless-steel foil for a separator is preferably in the range of 0.03 mm to 0.3 mm. If the sheet thickness of the stainless-steel foil for a separator is not more than 0.03 mm, the production efficiency of stainless-steel foil declines. If the sheet thickness of the stainless-steel foil for a separator exceeds 0.3 mm, the installation space or weight when stacking fuel cells increases. The sheet thickness of the stainless-steel foil for a separator is more preferably in the range of 0.03 mm to 0.1 mm.

(2) Sn Alloy Layer

As a Sn alloy layer with which the surface of the substrate is coated, a Sn alloy (for example, $Ni_3Sn_2$, $Ni_3Sn_4$, FeSn, $FeSn_2$, etc.) containing at least one selected from Ni and Fe excellent in corrosion resistance in the use environment (pH: 3 (sulfuric acid environment), use temperature: 80° C.) of separators of polymer electrolyte fuel cells is preferably used. $Ni_3Sn_2$ which is an intermetallic compound is particularly preferable.

The reason why the aforementioned Sn alloy is excellent in corrosion resistance in the use environment of separators of polymer electrolyte fuel cells is considered as follows.

A bond in a Sn alloy, such as a Sn—Ni or Sn—Fe bond, has a more stable bonding state than a Sn—Sn bond in simple metal Sn, and so improves the corrosion resistance. In particular, $Ni_3Sn_2$ has a formation temperature in a high temperature range of 790° C. or more according to a binary alloy phase diagram of Ni—Sn and forms a very stable Sn—Ni bond, which contributes to excellent corrosion resistance.

The thickness of the Sn alloy layer is preferably 5 μm or less in terms of the installation space and weight when stacking fuel cells. If the thickness of the Sn alloy layer is less than 0.1 μm, coating defects increase and the corrosion resistance tends to degrade. Accordingly, the thickness of the Sn alloy layer is preferably 0.1 μm or more. The thickness of the Sn alloy layer is more preferably in the range of 0.5 μm to 3 μm.

An electroplating method is suitable for the formation of the Sn alloy layer on the surface of the stainless-steel foil substrate. A conventionally known electroplating method may be used to immerse the substrate in a plating bath adjusted to a predetermined composition and electroplate the substrate.

(3) Strike

In the disclosure, a strike layer is formed between the stainless-steel foil substrate and the Sn alloy layer to improve the adhesion between the film and the substrate. The reason why forming the strike layer between the stainless-steel foil substrate and the Sn alloy layer improves the adhesion between the film and the substrate is considered as follows.

In the case where there is no strike layer, an inactive passive film or the like tends to be formed on the surface of the stainless-steel foil substrate, making it difficult to attain high adhesion. In the case where the strike layer is provided, on the other hand, the formation of the passive film or the like is suppressed and the surface of the stainless-steel foil substrate is kept from becoming inactive, as a result of which the adhesion between the substrate and the Sn alloy layer is improved.

The stainless-steel foil for a separator of a polymer electrolyte fuel cell according to the disclosure thus has excellent adhesion between the substrate and the Sn alloy layer, and therefore is advantageous in the process of forming the separator into a desired shape or the process of assembling the fuel cell where high adhesion is required, or when the fuel cell vibrates violently during use.

In the disclosure, it is very important to limit the coverage of the strike layer on the substrate to the following range:
the coverage of the strike layer on the substrate: 2% to 70%.

By limiting the coverage of the strike layer on the substrate to this range, the corrosion resistance in the separator use environment can be maintained even in the case where the Sn alloy layer is made thinner. The reason for this is considered as follows.

Typically, when the thickness of the Sn alloy layer is reduced, in-film defects from the Sn alloy layer to the substrate increase. Through these defects, the strike layer between the stainless-steel foil substrate and the Sn alloy layer is widely corroded continuously and uniformly in the surface direction, causing the Sn alloy layer above the strike layer to peel off from the stainless-steel foil substrate. When the Sn alloy layer peels off, the stainless-steel substrate is exposed to the separator use environment, and as a result the corrosion resistance declines.

Limiting the coverage of the strike layer on the substrate to the aforementioned range, on the other hand, allows the strike layer to be formed discontinuously or non-uniformly on the surface of the substrate. In other words, a discontinuous portion such as a non-coating area of the strike layer appears in part of the surface of the substrate. In the discontinuous portion of the strike layer, the Sn alloy layer and the stainless-steel foil substrate adhere to each other, and ions causing corrosion do not spread, so that the propagation of the corrosion is inhibited. Hence, the continuous and uniform corrosion of the strike layer can be suppressed even in the case where the Sn alloy layer is made thinner. The degradation of the corrosion resistance can be prevented in this way.

In addition, the formation of a discontinuous portion such as a-non-coating area of the strike layer in part of the surface of the substrate makes the interface between the substrate and the Sn alloy layer rough, and so the adhesion property can be maintained by the anchor effect.

If the coverage of the strike layer on the substrate is less than 2%, the adhesion between the stainless-steel foil substrate and the Sn alloy layer decreases. If the coverage of the strike layer on the substrate exceeds 70%, the corrosion resistance cannot be maintained in the case where the thickness of the Sn alloy layer is reduced. Accordingly, the coverage of the strike layer on the substrate is limited to the range of 2% to 70%. The coverage of the strike layer on the substrate is preferably in the range of 5% to 60%, more preferably in the range of 10% to 50%, and further preferably in the range of 15% to 40%.

In addition to the aforementioned coverage of the strike layer on the substrate, it is preferable to limit the coating form of the strike as follows:

the strike layer being distributed in the form of islands and the maximum diameter of each island-like coating portion being 1 µm or less.

It is thus preferable to distribute the strike layer in the form of islands on the surface of the substrate and limit the maximum diameter of each island-like coating portion to 1 µm or less.

By limiting the coating form of the strike in this way, discontinuous portions such as non-coating areas of the strike layer are formed throughout the surface of the substrate. This suppresses the continuous corrosion of the strike layer more effectively, and prevents the degradation of the corrosion resistance more effectively.

This also makes the whole interface between the stainless-steel foil of the substrate and the Sn alloy layer rough, and so enhances the adhesion property by the anchor effect.

It is therefore preferable to distribute the strike layer in the form of islands on the surface of the substrate and limit the maximum diameter of each island-like coating portion to 1 µm or less.

In the case where the coverage is limited to the range of 5% to 60%, 10% to 50%, or 15% to 40%, the maximum diameter of each coating portion is preferably limited to 0.5 µm or less, and more preferably limited to 0.1 µm or less.

The specific shape of each island-like coating portion is not particularly limited, and may be any of circular, elliptic, polygonal, ameboid (a shape extending in a plurality of irregular directions), etc. The maximum diameter of each island-like coating portion is defined as the diameter of the smallest circle that touches two or more points on the perimeter of the island-like coating portion and completely encloses the island-like coating portion.

The strike layer is preferably a metal layer of Au, Ag, Cu, Ni, or the like or an alloy layer containing at least one selected from these elements. A Ni strike or a Ni—P strike made of an alloy layer of Ni and P is more preferable in terms of material cost.

In the case of a Ni—P strike, it is further preferable to limit the P content in the Ni—P strike layer to the range of 5% to 22% by mass.

P content in Ni—P strike layer: 5% to 22% by mass

By limiting the P content in the Ni—P strike layer to this range, excellent corrosion resistance can be maintained more stably even in the event of long exposure to high potential in the separator use environment. The reason for this is considered as follows.

By limiting the P content in the Ni—P strike layer to the range of 5% to 22% by mass, a more stable Ni—P compound in the separator use environment is formed, with it being possible to suppress the corrosion of the strike layer effectively for a longer time.

If the P content in the Ni—P strike layer is less than 5% by mass, the corrosion resistance improvement effect is insufficient. If the P content in the Ni—P strike layer exceeds 22% by mass, the composition of the Ni—P strike tends to be not uniform. Such a range is also not preferable in terms of maintaining excellent corrosion resistance in the event of long exposure to high potential in the separator use environment. Therefore, the P content in the Ni—P strike layer is preferably limited to the range of 5% to 22% by mass. The P content in the Ni—P strike layer is more preferably in the range of 7% to 20% by mass, and further preferably in the range of 10% to 18% by mass.

The method of forming the strike layer may be a conventionally known electroplating method whereby electroplating is performed in a plating bath adjusted to an appropriate composition. Here, to limit the coating form of the strike layer as mentioned above, the time of retention in the plating bath, i.e. the electroplating time, and the current density during electroplating need to be controlled appropriately.

The electroplating time and the current density during electroplating influence the coverage on the substrate, and the current density during electroplating also influences the maximum diameter of each island-like coating portion. When the electroplating time is longer and the current density is higher, the coverage on the substrate is higher. Moreover, a higher current density typically facilitates nucleation, which contributes to a smaller maximum diameter of each island-like coating portion.

For example, consider the case of forming a Ni—P strike under the condition shown in Example 1 described later. Although fine adjustment is needed for differences depending on the structure of the electroplating apparatus such as the distance between electrodes and the size of the plating tank, an electroplating time of 2 seconds to 60 seconds and a current density of 3 A/dm$^2$ to 8 A/dm$^2$ enable the coverage of the strike layer on the substrate to be limited to the predetermined range and also enable the coating portion covering the surface of the substrate to be distributed in the form of islands so that the maximum diameter of each coating portion is 1 µm or less.

The P content in the Ni—P strike layer is adjustable by the P concentration in the plating bath and the current density during plating.

(4) Sn-containing oxide layer

In the stainless-steel foil for a separator according to the disclosure, the surface of the Sn alloy layer is preferably coated with a Sn-containing oxide layer. This further improves the corrosion resistance after long use in the separator use environment.

The Sn-containing oxide layer with which the surface of the Sn alloy layer is coated is not a natural oxide layer formed in the atmospheric environment but an oxide layer intentionally formed by a process such as immersion in an acid solution. The thickness of the natural oxide layer is typically about 2 nm to 3 nm.

The main component of the Sn-containing oxide layer is preferably $SnO_2$. The thickness of the Sn-containing oxide layer is preferably in the range of 5 nm to 50 nm. The thickness of the Sn-containing oxide layer is more preferably in the range of 10 nm to 30 nm. If the Sn-containing oxide layer is excessively thick, the conductivity decreases. If the Sn-containing oxide layer is excessively thin, the corrosion resistance improvement effect in the separator use environment cannot be attained.

The reason why coating the surface of the Sn alloy layer with the Sn-containing oxide layer improves the corrosion resistance after long use in the separator use environment is considered as follows. Since the Sn-containing oxide layer is very stable in the separator use environment, coating the surface of the Sn alloy layer with the Sn-containing oxide layer suppresses the corrosion of the Sn alloy layer effectively.

Here, the oxide layer is intentionally formed by a process such as immersion in an acid solution instead of using a natural oxide layer, for the following reason. Through such a process, the oxide layer can be uniformly and accurately formed on the surface of the Sn alloy layer, with it being possible to suppress the corrosion of the Sn alloy layer very effectively.

The Sn-containing oxide layer may be formed by a method of immersion in an acid aqueous solution having oxidizability such as hydrogen peroxide or nitric acid, or a method of electrochemical anode electrolytic treatment.

For example, the Sn-containing oxide layer can be formed by, in a sulfuric acid aqueous solution of a temperature of 60° C. and a pH of 2, passing current through the stainless-steel foil for a separator having the Sn alloy layer for 5 minutes with a current density of +1 $mA/cm^2$.

The method of forming the Sn-containing oxide layer is not limited to the above. Other examples include physical vapor deposition (PVD), chemical vapor deposition (CVD), and coating.

(5) Other Features

After forming the Sn alloy layer on the surface of the stainless-steel foil substrate with the strike layer in between or after forming the Sn alloy layer on the surface of the stainless-steel foil substrate with the strike layer in between and then forming the Sn-containing oxide layer, a conductive layer with low electric resistance may be further formed on the Sn alloy layer or the Sn-containing oxide layer, to improve the conductivity which is one of the required separator properties. For example, the Sn alloy layer or the Sn-containing oxide layer may be coated with a metal layer, a conductive polymer layer, an alloy layer containing conductive particles, or a polymer layer containing conductive particles, in order to reduce the contact resistance.

EXAMPLES

Separators of polymer electrolyte fuel cells are used in a severe corrosion environment of about 80° C. in temperature and 3 in pH, and therefore excellent corrosion resistance is required. Moreover, high adhesion between the stainless-steel foil substrate and the Sn alloy layer is required so that the Sn alloy layer does not peel off from the stainless-steel foil substrate in the fuel cell manufacturing process such as the process of forming the separator into a desired shape or the process of assembling the fuel cell. Further, a reduction in sheet thickness increase rate after the film formation on the surface of the stainless-steel foil substrate is required to make the fuel cell more compact. In view of these required properties, the following three types of evaluation were conducted on the samples described later.

(1) Evaluation of Corrosion Resistance (Long-Term Stability in Separator Use Environment)

Typically, stainless steel is more susceptible to transpassive dissolution and suffers greater degradation in corrosion resistance when the applied potential is higher. To evaluate the stability in the event of long exposure to high potential in the separator use environment, each sample was immersed in a sulfuric acid aqueous solution of a temperature of 80° C. and a pH of 3 and subjected to the application of a constant potential of 0.9 V (vs. SHE) for 100 hours using Ag/AgCl (saturated KCl aqueous solution) as a reference electrode, and the total electric charge conducted for 100 hours was measured. Based on the total electric charge conducted for 100 hours, the corrosion resistance was evaluated by the following criteria.

Excellent: the total electric charge conducted for 100 hours is less than 15 $mC/cm^2$.

Good: the total electric charge conducted for 100 hours is 15 $mC/cm^2$ or more and less than 50 $mC/cm^2$.

Poor: the total electric charge conducted for 100 hours is 50 $mC/cm^2$ or more.

(2) Evaluation of Adhesion Property

Figure 2:
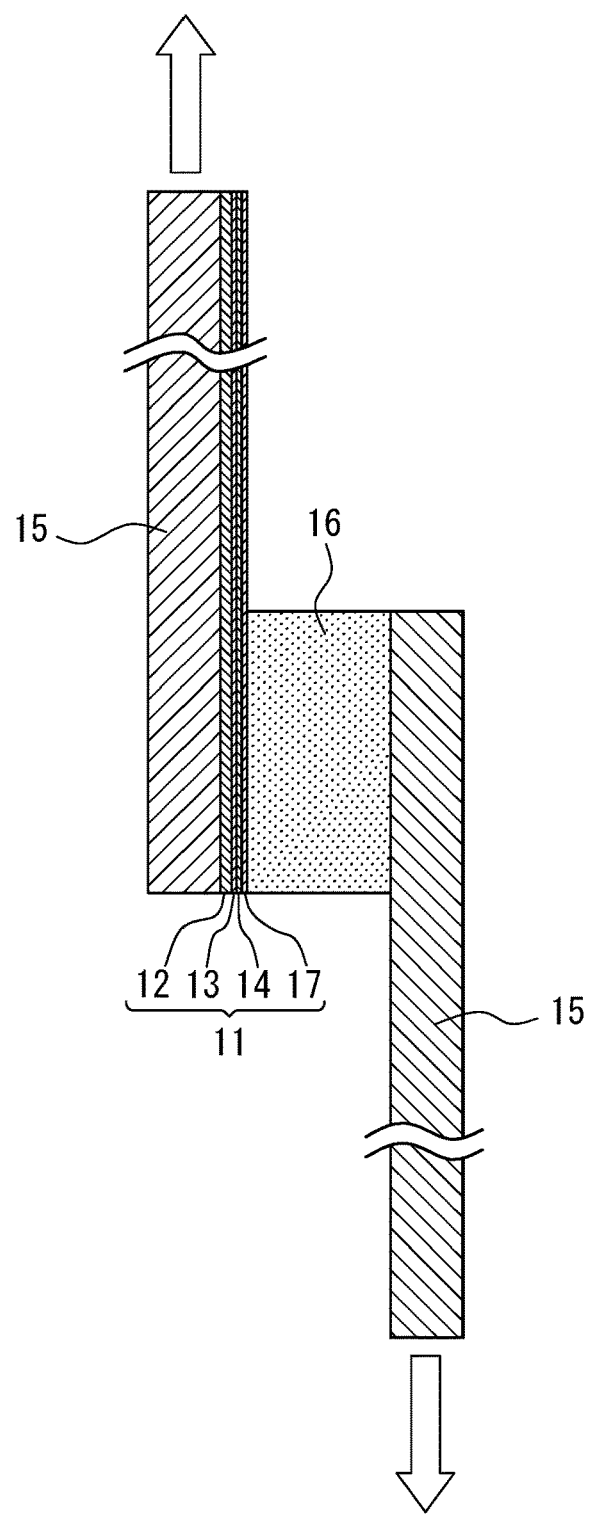
FIG. 2 is a schematic diagram illustrating a test piece for an adhesion test.

Each sample having the layer formed on the surface of the substrate (0.05 mm in thickness) was cut to 25 mm W×80 mm L. The cut sample and a cold rolled steel sheet of 25 mm W×80 mm L×1 mm t were joined so as to partially overlap in the surface coated with the layer, to produce a test piece for adhesion evaluation as illustrated in FIG. 2. Here, the sample and the cold rolled steel sheet were joined using an adhesive (E-56 manufactured by Sunrise MSI Corporation) with the thickness of the adhesive being 2 mm and the adhesion area being 25 mm W×20 mm L. Due to the small sheet thickness of the sample (substrate), another cold rolled steel sheet (25 mm W×80 mm L×1 mm t) was joined to the opposite surface to the surface bonded to the cold rolled steel sheet, for reinforcement.

In FIG. 2, reference sign 11 is a sample, 12 is a stainless-steel foil substrate, 13 is a strike layer, 14 is a Sn alloy layer, 15 is a cold rolled steel sheet, 16 is an adhesive, and 17 is a Sn-containing oxide layer.

The obtained test piece for adhesion evaluation was pulled from both sides by a tensile testing machine to determine the tensile strength (peeling strength) at the time of peeling of the layer off the substrate, and the adhesion property of the layer was evaluated by the following criteria.

Excellent: the peeling strength is 6 MPa or more.

Good: the peeling strength is 2 MPa or more and less than 6 MPa.

Poor: the peeling strength is less than 2 MPa.

(3) Evaluation of Compactness

The sheet thickness increase rate was calculated using the equation below, and the compactness when stacking fuel cells was evaluated by the following criteria.

Sheet thickness increase rate (%)={([thickness of Sn alloy layer per side]×2)/[thickness of stainless-steel foil substrate]}×100.

Good: the sheet thickness increase rate is 20% or less.

Poor: the sheet thickness increase rate exceeds 20%.

The thickness of the strike layer and the thickness of the Sn-containing oxide layer are sufficiently small compared with the thickness of the Sn alloy layer, and so are excluded here.

Example 1

Each of SUS447J1 (Cr: 30% by mass, Mo: 2% by mass), SUS445J1 (Cr: 22% by mass, Mo: 1% by mass), and SUS316L (Cr: 18% by mass, Ni: 12% by mass, Mo: 2% by mass) of 0.05 mm in sheet thickness as a stainless-steel foil substrate was subjected to appropriate pretreatment such as degreasing, and then a strike layer with the coating form shown in Table 1 was formed on the stainless-steel foil substrate using the following plating bath composition and plating condition. Next, a Sn alloy layer with the average thickness shown in Table 1 was formed on the stainless-steel foil substrate having the strike layer using the following plating bath composition and plating condition, to obtain a stainless-steel foil for a separator.

In some of the samples, current was passed through the obtained stainless-steel foil for a separator in a sulfuric acid aqueous solution of a temperature of 60° C. and a pH of 2 for 5 minutes with a current density of +1 mA/cm$^2$, to form a Sn-containing oxide layer on the surface of the Sn alloy layer.

Each property was evaluated in the aforementioned manner using the obtained stainless-steel foil for a separator.

The coating form of the strike layer was controlled by determining the relationship with the electroplating time and the current density beforehand. The average thickness of the Sn alloy layer and the average thickness of the Sn-containing oxide layer were each controlled by determining the relationship with the plating time or the anode electrolysis time beforehand. For comparison, a stainless-steel foil for a separator having no strike layer was also prepared, and each property was evaluated in the aforementioned manner.

The coverage of the strike layer on the substrate and the maximum diameter of each island-like coating portion were measured by the following method.

First, each sample obtained by forming the strike layer on the surface of the substrate (0.05 mm in thickness) was cut to about 10 mm W×10 mm L, and the coating form of the strike layer was observed using a scanning electron microscope (SEM) and the maximum diameter of each island-like coating portion was measured.

Next, the coating portion and non-coating portion of the strike layer were binarized using image analysis software, to calculate the coverage on the substrate. Although the magnification in the SEM observation may be freely changed according to the maximum diameter of the coating portion, the magnification is preferably about 10000 to 100000.

The measurement of each of the coverage of the strike layer on the substrate and the maximum diameter of each island-like coating portion was performed on 10 samples obtained by cutting the same sample having the strike layer to the aforementioned shape, and the maximum value was selected.

Here, the composition of the strike made of an alloy layer of Ni and P was measured by an energy-dispersive X-ray spectrometer (EDX) used in the SEM observation.

Regarding the samples having no strike, "-" is shown in both of the fields of the coverage on the substrate and maximum diameter of island-like coating portion of the strike layer in Table 1.

The average thickness of the Sn alloy layer was measured by the following method. First, each sample obtained by forming the strike layer and the Sn alloy layer on the surface of the substrate (0.05 mm in thickness) was cut to about 10 mm W×15 mm L. The sample was then embedded in resin, polished in the cross section, and observed using a scanning electron microscope (SEM) to measure the thickness of the Sn alloy layer. The measurement of the thickness of the Sn alloy layer was performed on 10 samples obtained by cutting the same sample having the Sn alloy layer to the aforementioned shape, and the average thickness of these samples was set as the average thickness of the Sn alloy layer.

Here, the composition of the Sn alloy layer was identified by an energy-dispersive X-ray spectrometer (EDX) and X-ray diffractometer (XRD) used in the SEM observation.

The average thickness of the Sn-containing oxide layer was measured by the following method. First, each sample obtained by forming the strike layer, the Sn alloy layer, and the Sn-containing oxide layer on the surface of the substrate (0.05 mm in thickness) was processed by a focused ion beam to prepare a thin film for cross-section observation. The produced thin film for cross-section observation was then observed using a transmission electron microscope (TEM), to measure the average thickness of the Sn-containing oxide layer. In the measurement of the thickness of the Sn-containing oxide layer, the thickness of the Sn-containing oxide layer in the prepared thin film for cross-section observation was measured at three locations, and the average value of the three locations was set as the average thickness of the Sn-containing oxide layer.

Here, the composition of the oxide layer was identified by an energy-dispersive X-ray spectrometer (EDX) and X-ray photoelectron spectrometer (XPS) used in the TEM observation.

(Plating Bath Composition and Plating Condition of Strike Layer) <Ni Strike>

Nickel chloride: 240 g/L

Hydrochloric acid: 125 ml/L

Temperature: 50° C.

Electroplating time: 2 seconds to 60 seconds

Current density: 3 A/dm$^2$ to 8 A/dm$^2$

<Ni—P Strike>

Nickel sulfate: 1 mol/L

Nickel chloride: 0.1 mol/L

Boric acid: 0.5 mol/L

Sodium phosphite: 0.05 mol/L to 5 mol/L

Temperature: 50° C.

Electroplating time: 2 seconds to 60 seconds

Current density: 3 A/dm$^2$ to 8 A/dm$^2$

<Cu Strike>

Copper cyanide: 30 g/L

Sodium cyanide: 40 g/L

Potassium hydroxide: 4 g/L

Temperature: 40° C.

Electroplating time: 2 seconds to 60 seconds

Current density: 3 A/dm$^2$ to 8 A/dm$^2$

<Ag Strike>
Silver potassium cyanide: 2 g/L
Sodium cyanide: 120 g/L
Temperature: 30° C.
Electroplating time: 2 seconds to 60 seconds
Current density: 3 A/dm² to 6 A/dm²
<Au Strike>
Gold potassium cyanide: 8 g/L
Sodium citrate: 80 g/L
Nickel sulfamate: 3 g/L
Zinc acetate: 0.3 g/L
Temperature: 30° C.
Electroplating time: 2 seconds to 60 seconds
Current density: 3 A/dm² to 6 A/dm²
(Plating Bath Composition and Plating Condition of Sn Alloy Layer)
<$Ni_3Sn_2$>
Nickel chloride: 0.15 mol/L
Tin chloride: 0.15 mol/L
Potassium pyrophosphate: 0.45 mol/L
Glycine: 0.15 mol/L
Temperature: 60° C.
Current density: 1 A/dm²
<$Ni_3Sn_4$>
Nickel chloride: 0.15 mol/L
Tin chloride: 0.30 mol/L
Potassium pyrophosphate: 0.45 mol/L
Temperature: 60° C.
Current density: 1 A/dm²
<FeSn>
Ferric chloride: 0.15 mol/L
Tin chloride: 0.18 mol/L
Potassium pyrophosphate: 0.45 mol/L
Temperature: 60° C.
Current density: 1 A/dm²
<$FeSn_2$>
Ferric chloride: 0.15 mol/L
Tin chloride: 0.36 mol/L
Potassium pyrophosphate: 0.45 mol/L
Temperature: 60° C.
Current density: 1 A/dm²

In the disclosure, as long as a desired plating can be formed, a plating bath composition other than the above may be used according to a known plating method.

Table 1 summarizes the results of evaluating the corrosion resistance (long-term stability in the separator use environment), the adhesion property, and the compactness for each sample obtained as described above. In each sample having the strike layer, the strike layer was distributed in the form of islands.

TABLE 1

| | | Sample preparation condition | | | | | | |
|---|---|---|---|---|---|---|---|---|
| | | Strike layer | | | | Sn alloy layer | | Sn-containing oxide layer |
| Sample No. | Substrate | Type | Coverage of the strike layer (%) | Maximum diameter of island-like coating portion (μm) | P content (% by mass) | Main component | Average thickness (μm) | Main component | Average thickness (nm) |
| 1 | SUS447J1 | N/A | — | — | — | $Ni_3Sn_2$ | 3.0 | $SnO_2$ | 15 |
| 2 | | Ni | 2 | 0.01 | — | | 1.0 | $SnO_2$ | 15 |
| 3 | | | 33 | 0.05 | — | | 1.0 | $SnO_2$ | 15 |
| 4 | | | 64 | 0.1 | — | | 1.0 | $SnO_2$ | 15 |
| 5 | | | 70 | 0.2 | — | | 1.0 | $SnO_2$ | 15 |
| 41 | | | 100 | Connected and unmeasurable | — | | 8.0 | $SnO_2$ | 15 |
| 42 | | | 100 | Connected and unmeasurable | — | | 11.0 | $SnO_2$ | 15 |
| 6 | | Ni—P | 1 | 0.01 | 14 | | 1.0 | $SnO_2$ | 15 |
| 7 | | | 5 | 0.02 | 13 | | 1.0 | $SnO_2$ | 15 |
| 8 | | | 10 | 0.02 | 15 | | 1.0 | $SnO_2$ | 15 |
| 9 | | | 25 | 0.03 | 15 | | 1.0 | — | — |
| 10 | | | 25 | 0.03 | 15 | | 1.0 | $SnO_2$ | 15 |
| 11 | | | 25 | 0.2 | 15 | | 1.0 | $SnO_2$ | 15 |
| 12 | | | 25 | 0.5 | 15 | | 1.0 | $SnO_2$ | 15 |
| 43 | | | 25 | 0.9 | 15 | | 1.0 | $SnO_2$ | 15 |
| 13 | | | 25 | 1.5 | 15 | | 1.0 | $SnO_2$ | 15 |
| 14 | | | 40 | 0.03 | 5 | | 1.0 | $SnO_2$ | 15 |
| 15 | | | 52 | 0.08 | 22 | | 1.0 | $SnO_2$ | 15 |
| 17 | | | 64 | 1.0 | 15 | | 1.0 | $SnO_2$ | 15 |
| 44 | | | 72 | 0.1 | 15 | | 1.0 | $SnO_2$ | 15 |
| 19 | | | 85 | 1.5 | 13 | | 1.0 | $SnO_2$ | 15 |
| 45 | | | 100 | Connected and unmeasurable | 15 | | 6.0 | $SnO_2$ | 15 |
| 46 | | | 100 | Connected and unmeasurable | 15 | | 15.0 | $SnO_2$ | 15 |
| 20 | | Cu | 27 | 0.05 | — | $Ni_3Sn_2$ | 1.0 | $SnO_2$ | 15 |
| 21 | | | 41 | 0.08 | — | | 1.0 | $SnO_2$ | 15 |
| 22 | | As | 32 | 0.07 | — | | 1.0 | $SnO_2$ | 15 |
| 23 | | | 55 | 0.12 | — | | 1.0 | $SnO_2$ | 15 |
| 24 | | Au | 19 | 0.04 | — | | 1.0 | $SnO_2$ | 15 |
| 25 | | | 38 | 0.07 | — | | 1.0 | $SnO_2$ | 15 |
| 26 | | Ni—P | 25 | 0.03 | 14 | $Ni_3Sn_4$ | 1.0 | $SnO_2$ | 20 |
| 27 | | | 25 | 0.03 | 14 | FeSn | 1.0 | $SnO_2$ | 20 |
| 28 | | | 25 | 0.03 | 14 | $FeSn_2$ | 1.0 | $SnO_2$ | 20 |
| 29 | SUS445J1 | N/A | — | — | — | $Ni_3Sn_2$ | 3.0 | $SnO_2$ | 15 |

TABLE 1-continued

| | | | | | | | | |
|---|---|---|---|---|---|---|---|---|
| 30 | Ni | 30 | 0.05 | — | | 1.0 | SnO$_2$ | 15 |
| 31 | Ni—P | 25 | 0.04 | 15 | | 1.0 | SnO$_2$ | 15 |
| 32 | Cu | 27 | 0.06 | — | | 1.0 | SnO$_2$ | 15 |
| 33 | Ag | 31 | 0.07 | — | | 1.0 | SnO$_2$ | 15 |
| 34 | Au | 22 | 0.05 | — | | 1.0 | SnO$_2$ | 15 |
| 35 | SUS316L | N/A | — | — | Ni$_3$Sn$_2$ | 3.0 | SnO$_2$ | 15 |
| 36 | Ni | 35 | 0.06 | — | | 1.0 | SnO$_2$ | 15 |
| 37 | Ni—P | 22 | 0.03 | 15 | | 1.0 | SnO$_2$ | 15 |
| 38 | Cu | 30 | 0.06 | — | | 1.0 | SnO$_2$ | 15 |
| 39 | Ag | 35 | 0.08 | — | | 1.0 | SnO$_2$ | 15 |
| 40 | Au | 28 | 0.07 | — | | 1.0 | SnO$_2$ | 15 |

| Sample No. | Total electric charge for 100 hours (mC/cm$^2$) | Peeling strength (MPa) | Sheet thickness increase rate (%) | Corrosion resistance | Adhesion | Compactness | Remarks |
|---|---|---|---|---|---|---|---|
| 1 | 6.1 | 1.6 | 12.0 | Excellent | Poor | Good | Comparative Example |
| 2 | 7.7 | 3.6 | 4.0 | Excellent | Good | Good | Example |
| 3 | 10.5 | 7.6 | 4.0 | Excellent | Excellent | Good | Example |
| 4 | 11.7 | 8.0 | 4.0 | Excellent | Excellent | Good | Example |
| 5 | 12.6 | 10.8 | 4.0 | Excellent | Excellent | Good | Example |
| 41 | 216 | 11.2 | 32.0 | Poor | Excellent | Poor | Comparative Example |
| 42 | 14.7 | 11.6 | 44.0 | Excellent | Excellent | Poor | Comparative Example |
| 6 | 7.5 | 1.8 | 4.0 | Excellent | Poor | Good | Comparative Example |
| 7 | 6.8 | 5.8 | 4.0 | Excellent | Good | Good | Example |
| 8 | 6.7 | 6.2 | 4.0 | Excellent | Excellent | Good | Example |
| 9 | 39.1 | 6.4 | 4.0 | Good | Excellent | Good | Example |
| 10 | 7.9 | 7.4 | 4.0 | Excellent | Excellent | Good | Example |
| 11 | 10.8 | 7.1 | 4.0 | Excellent | Excellent | Good | Example |
| 12 | 12.5 | 6.8 | 4.0 | Excellent | Excellent | Good | Example |
| 43 | 13.2 | 6.4 | 4.0 | Excellent | Excellent | Good | Example |
| 13 | 21.6 | 6.5 | 4.0 | Good | Excellent | Good | Example |
| 14 | 9.7 | 7.1 | 4.0 | Excellent | Excellent | Good | Example |
| 15 | 11.3 | 8.6 | 4.0 | Excellent | Excellent | Good | Example |
| 17 | 14.8 | 10.3 | 4.0 | Excellent | Excellent | Good | Example |
| 44 | 52.3 | 10.9 | 4.0 | Poor | Excellent | Good | Comparative Example |
| 19 | 149 | 10.6 | 4.0 | Poor | Excellent | Good | Comparative Example |
| 45 | 98.5 | 11.4 | 24.0 | Poor | Excellent | Poor | Comparative Example |
| 46 | 14.1 | 11.0 | 60.0 | Excellent | Excellent | Poor | Comparative Example |
| 20 | 7.2 | 7.5 | 4.0 | Excellent | Excellent | Good | Example |
| 21 | 7.8 | 8.1 | 4.0 | Excellent | Excellent | Good | Example |
| 22 | 6.8 | 6.8 | 4.0 | Excellent | Excellent | Good | Example |
| 23 | 7.4 | 8.4 | 4.0 | Excellent | Excellent | Good | Example |
| 24 | 6.5 | 7.2 | 4.0 | Excellent | Excellent | Good | Example |
| 25 | 6.8 | 7.9 | 4.0 | Excellent | Excellent | Good | Example |
| 26 | 9.2 | 6.8 | 4.0 | Excellent | Excellent | Good | Example |
| 27 | 12.3 | 7.2 | 4.0 | Excellent | Excellent | Good | Example |
| 28 | 11.9 | 7.3 | 4.0 | Excellent | Excellent | Good | Example |
| 29 | 10.2 | 1.1 | 12.0 | Excellent | Poor | Good | Comparative Example |
| 30 | 13.6 | 7.8 | 4.0 | Excellent | Excellent | Good | Example |
| 31 | 11.8 | 7.2 | 4.0 | Excellent | Excellent | Good | Example |
| 32 | 11.3 | 8.0 | 4.0 | Excellent | Excellent | Good | Example |
| 33 | 10.9 | 6.2 | 4.0 | Excellent | Excellent | Good | Example |
| 34 | 10.3 | 7.3 | 4.0 | Excellent | Excellent | Good | Example |
| 35 | 13.6 | 1.5 | 12.0 | Excellent | Poor | Good | Comparative Example |
| 36 | 14.8 | 8.0 | 4.0 | Excellent | Excellent | Good | Example |
| 37 | 14.1 | 7.5 | 4.0 | Excellent | Excellent | Good | Example |
| 38 | 13.3 | 7.8 | 4.0 | Excellent | Excellent | Good | Example |
| 39 | 12.7 | 6.5 | 4.0 | Excellent | Excellent | Good | Example |
| 40 | 12.1 | 6.8 | 4.0 | Excellent | Excellent | Good | Example |

The table reveals the following points.

(a) The samples of Examples all have low total electric charge conducted for 100 hours in the corrosion resistance evaluation, and show favorable corrosion resistance even in the event of long exposure to high potential as in the separator use environment.

(b) The samples of Examples all have significantly increased tensile strength (peeling strength) necessary for layer peeling, and have significantly improved adhesion property.

(c) The samples of Examples all have a low sheet thickness increase rate, and have excellent compactness when stacking fuel cells.

(d) Example No. 10 having the Sn oxide layer has low total electric charge conducted for 100 hours in the corrosion resistance evaluation and has improved corrosion resistance, compared with Example No. 9 having no Sn oxide.

(e) Examples No. 10, No. 11, No. 12, and No. 43 where the maximum diameter of the island-like coating portion of the strike layer is 1 μm or less have low total electric charge conducted for 100 hours in the corrosion resistance evaluation and have improved corrosion resistance, compared with Example No. 13 where the maximum diameter is more than 1 μm.

(f) The samples of Comparative Examples No. 1, No. 29, and No. 35 having no strike layer have low tensile strength (peeling strength) necessary for layer peeling, and do not exhibit desired adhesion property.

(g) The sample of Comparative Example No. 6 with the coverage of the strike layer on the substrate below the appropriate range has low tensile strength (peeling strength) necessary for layer peeling, and do not exhibit desired adhesion property.

(h) The samples of Comparative Examples No. 19, No. 41, No. 44, and No. 45 with the coverage of the strike layer on the substrate exceeding the appropriate range have high large total electric charge conducted for 100 hours, and do not exhibit desired corrosion resistance.

(i) The sample of Comparative Example No. 42 or No. 46 having a thicker Sn alloy layer than the sample of Comparative Example No. 41 or No. 45 has desired corrosion resistance but poor compactness.

REFERENCE SIGNS LIST 1 membrane-electrode joined body
2, 3 gas diffusion layer
4, 5 separator
6 air passage
7 hydrogen passage
11 sample
12 stainless-steel foil substrate
13 strike layer
14 Sn alloy layer
15 cold rolled steel sheet
16 adhesive
17 Sn-containing oxide layer

The invention claimed is:

1. A stainless-steel foil for a separator of a polymer electrolyte fuel cell, comprising:
a substrate made of stainless-steel foil; and
a Sn alloy layer with which a surface of the substrate is coated, with a strike layer in between,
wherein a coverage of the strike layer on the substrate is in a range of 2% to 70%, and
the strike layer is distributed in a form of islands, and a maximum diameter of each of the islands as coating portions is 1 μm or less.

2. The stainless-steel foil for a separator of a polymer electrolyte fuel cell according to claim 1, wherein the Sn alloy layer contains at least one selected from the group consisting of Ni and Fe.

3. The stainless-steel foil for a separator of a polymer electrolyte fuel cell according to claim 2, wherein the strike layer contains at least one element selected from the group consisting of Ni, Cu, Ag, and Au.

4. The stainless-steel foil for a separator of a polymer electrolyte fuel cell according to claim 3, further comprising a Sn-containing oxide layer on a surface of the Sn alloy layer.

5. The stainless-steel foil for a separator of a polymer electrolyte fuel cell according to claim 1, wherein the Sn alloy layer contains $Ni_3Sn_2$.

6. The stainless-steel foil for a separator of a polymer electrolyte fuel cell according to claim 5, wherein the strike layer is made of an alloy layer of Ni and P, and has a P content in a range of 5% to 22% by mass.

7. The stainless-steel foil for a separator of a polymer electrolyte fuel cell according to claim 6, further comprising a Sn-containing oxide layer on a surface of the Sn alloy layer.

8. The stainless-steel foil for a separator of a polymer electrolyte fuel cell according to claim 7, wherein the Sn-containing oxide layer has a thickness in a range of 5 nm to 30 nm.

9. The stainless-steel foil for a separator of a polymer electrolyte fuel cell according to claim 1, wherein the strike layer contains at least one element selected from the group consisting of Ni, Cu, Ag, and Au.

10. The stainless-steel foil for a separator of a polymer electrolyte fuel cell according to claim 9, wherein the strike layer is made of an alloy layer of Ni and P, and has a P content in a range of 5% to 22% by mass.

11. The stainless-steel foil for a separator of a polymer electrolyte fuel cell according to claim 1, further comprising a Sn-containing oxide layer on a surface of the Sn alloy layer.

12. The stainless-steel foil for a separator of a polymer electrolyte fuel cell according to claim 11, wherein the Sn-containing oxide layer has a thickness in a range of 5 nm to 30 nm.

* * * * *